(12) United States Patent  (10) Patent No.: US 7,936,180 B2
Chao et al.  (45) Date of Patent: May 3, 2011

(54) SERIAL LINK TRANSMITTER

(75) Inventors: Kuan-Hua Chao, Taipei County (TW); Chih-Chien Hung, Hualien County (TW); Pao-Cheng Chiu, Taipei County (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 12/265,774

(22) Filed: Nov. 6, 2008

(65) Prior Publication Data

US 2009/0195288 A1  Aug. 6, 2009

Related U.S. Application Data

(60) Provisional application No. 61/025,335, filed on Feb. 1, 2008.

(51) Int. Cl.
 *H03K 17/16* (2006.01)
 *H03K 19/003* (2006.01)
(52) U.S. Cl. .................. 326/30; 326/34; 326/86; 326/90
(58) Field of Classification Search .................. None
 See application file for complete search history.

(56) References Cited

U.S. PATENT DOCUMENTS

| 5,781,028 | A   | * | 7/1998 | Decuir .......................... 326/30 |
| 6,617,888 | B2  |   | 9/2003 | Volk |
| 2004/0183565 | A1 | * | 9/2004 | Viehmann et al. ............. 326/30 |
| 2008/0024178 | A1 |   | 1/2008 | Kim et al. |
| 2008/0037617 | A1 | * | 2/2008 | Tang et al. .................... 375/220 |
| 2008/0137721 | A1 | * | 6/2008 | Hsu et al. ...................... 375/231 |
| 2009/0051389 | A1 | * | 2/2009 | Nguyen ......................... 326/62 |

\* cited by examiner

*Primary Examiner* — Anh Q Tran
(74) *Attorney, Agent, or Firm* — Thomas | Kayden

(57) ABSTRACT

The invention provides a serial link transmitter coupled to a serial link receiver through a pair of transmission lines and having a pair of transmitting terminals respectively coupled to one of the transmission lines. The serial link transmitter comprises a differential amplifier and a voltage clamping circuit. The differential amplifier generates a pair of differential output voltages on the transmitting terminals according to a pair of differential input voltages for transmitting data to the serial link receiver, and the differential output voltages are transmitted with a common mode voltage to the serial link receiver during data transmission. The voltage clamping circuit clamps the pair of differential output voltages of the transmitting terminals to the common mode voltage before the serial link transmitter transmits data to the serial link receiver.

23 Claims, 10 Drawing Sheets

SERIAL LINK TRANSMITTER

CROSS REFERENCE TO RELATED APPLICATIONS

This application claims the benefit of U.S. Provisional Application No. 61/025,335, filed on Jan. 2, 2008.

BACKGROUND OF THE INVENTION

1. Field of the Invention

The invention relates to serial link transmitters, and more particularly to data transmission of serial link transmitters.

2. Description of the Related Art

Serial link data transmission is widely used in computer systems. An example of a serial link transmission system is a serial advanced technology attachment (SATA) bus, which is a computer bus primarily designed for transfer of data between a computer and mass storage devices such as hard disk drives and optical drives. In a serial link transmission system, a serial link transmitter sequentially sends one data bit at one time over a communication channel or computer bus to a serial link receiver for data transmission. Precision and correctness of serial link data transmission is important for computer systems.

Referring to FIG. 1A, a block diagram of a serial link transmission system 100 is shown. The system 100 comprises a serial link transmitter 102 and a serial link receiver 104. The serial link transmitter 102 comprises a pair of differential transmitting terminals tx+ and tx−, and the serial link receiver 104 comprises a pair of differential receiving terminals rx+ and rx−. Two transmission lines respectively couple a positive transmitting terminal tx+ and a negative transmitting terminal tx− to a positive receiving terminal rx+ and a negative receiving terminal rx− with capacitances 112 and 114 (illustrated as equivalent capacitors). When the serial link transmitter 102 transmits data, the serial link transmitter 102 generates a pair of differential output voltages $V_{tx+}$ and $V_{tx-}$ on the transmitting terminals tx+ and tx−. Because the capacitances 112 and 114 of the transmission lines are ordinarily greater than 1 nF, only alternate current (AC) portions of the differential output voltages $V_{tx+}$ and $V_{tx-}$ on the transmitting terminals tx+ and tx− could pass through the transmission lines to be received by the serial link receiver 104.

Referring to FIG. 1B, a schematic diagram of signals received by the serial link receiver 104 of FIG. 1A is shown. Two receiving terminals rx+ and rx− of the serial link receiver 104 respectively receive signals $V_{rx+}$ and $V_{rx-}$ from the transmission lines. The serial link receiver 104 comprises two resistors 122 and 124 respectively coupling the receiving terminals rx+ and rx− to a voltage source 126 with a common mode voltage $V_{cm\_rx}$. During periods $T_1$ and $T_{13}$, the serial link transmitter 102 transmits no data, and both the voltages $V_{rx+}$ and $V_{rx-}$ of the receiving terminals rx+ and rx− are consequently equal to the common mode voltage $V_{cm\_rx}$ of the voltage source 126 as shown in FIG. 1A. During a period $T_{12}$, the serial link transmitter 102 transmits data through the transmission lines, and the voltages $V_{rx+}$ and $V_{rx-}$ of the receiving terminals rx+ and rx− swing between threshold voltages $V_{H\_rx}$ and $V_{L\_rx}$.

Referring to FIG. 2, a block diagram of a serial link transmission system 200 with a conventional serial link transmitter 202 is shown. The serial link transmitter 202 comprises a differential amplifier comprising two resistors 232 and 234 with resistance R, two differential input transistors 236 and 238, a switch 240, and a current source 242 supplying a current $I_{ref}$. A negative transmitting terminal tx− is coupled to the resistor 232 and a drain of a positive input transistor 236, and a positive transmitting terminal tx+ is coupled to the resistor 234 and a drain of a negative input transistor 238. When the serial link transmitter 202 transmits data, the switch 240 couples the current source 242 to the sources of the differential input transistors 236 and 238, and the differential amplifier generates differential output signals $V_{tx+}$ and $V_{tx-}$ on the transmitting terminals tx+ and tx− according to voltages $V_{in+}$ and $V_{in-}$ on the gates of the differential input transistors 236 and 238. When the serial link transmitter 202 does not transmit data, the switch 240 decouples the current source 242 from the sources of the differential input transistors 236 and 238, thus disabling the differential amplifier to reduce power consumption of the serial link transmitter 202.

The circuit structure of the conventional serial link transmitter 202, however, induces abnormal initial amplitudes and abnormal initial levels of the differential output voltages $V_{tx+}$ and $V_{tx-}$ on the transmitting terminals tx+ and tx−. Referring to FIG. 3, a schematic diagram of an embodiment of voltages of transmitting terminals tx+ and tx− and receiving terminals rx+ and rx− of FIG. 2 is shown. The serial link transmitter 202 transmits no data during periods $T_{31}$ and $T_{33}$, and the switch 240 decouples the current source 242 from the differential amplifier 202 to disable the differential amplifier 202. Consequently, no current passes through the resistors 232 and 234, and voltages of the transmitting terminals tx+ and tx− are therefore raised to that of the voltage source $V_{DD}$. At a start of the period $T_{32}$, the serial link transmitter 202 starts to transmit data and generates differential output voltages $V_{tx+}$ and $V_{tx-}$ on the transmitting terminals tx+ and tx−. The transmission lines coupling the transmitting terminals tx+ and tx− and the receiving terminals rx+ and rx−, however, have capacitances 212 and 214 and require time to be gradually charged to the common mode voltage $V_{cm\_tx}$. As shown in FIG. 3, before the voltages of the transmission lines reaches a steady level of the common mode voltage $V_{cm\_tx}$, the differential output voltages $V_{tx+}$ and $V_{tx-}$ on the transmitting terminals tx+ and tx− have an average level deviating from the common mode voltage $V_{cm\_tx}$ and an oscillating amplitude smaller than a normal amplitude of $(V_{H\_tx}-V_{L\_tx})$.

The abnormal initial oscillating amplitude of the differential output voltages $V_{tx+}$ and $V_{tx-}$ on the transmitting terminals tx+ and tx− during the signaling period $T_{32}$ induces an abnormal initial oscillating amplitude of voltages $V_{rx+}$ and $V_{rx-}$ on the receiving terminals rx+ and rx−. Referring to FIG. 3, during the signaling period $T_{32}$, the voltages $V_{rx+}$ and $V_{rx-}$ on the receiving terminals rx+ and rx− have an initial oscillating amplitude smaller than a normal amplitude of $(V_{H\_rx}-V_{L\_rx})$, inducing a reduced initial amplitude of a differential received signal between the voltages $V_{rx+}$ and $V_{rx-}$. If a serial link receiver, such as a SATA receiver, measures an initial amplitude of a received signal to obtain a reference for out-of-band (OOB) determination, the reduced initial amplitude of the received signal will cause errors in out-of-band determination, degrading performance of the serial link transmission system 200. Thus, a serial link transmitter generating signals with acceptable initial oscillating amplitude is required.

BRIEF SUMMARY OF THE INVENTION

The invention provides a serial link transmitter. In one embodiment, the serial link transmitter is coupled to a serial link receiver through a pair of transmission lines and has a pair of transmitting terminals respectively coupled to one of the transmission lines. The serial link transmitter generates a pair of differential output voltages on the transmitting terminals for transmitting data to the serial link receiver, wherein the differential output voltages are transmitted with a common mode voltage to the serial link receiver during data transmission. The serial link transmitter is arranged to clamp the pair of differential output voltages of the transmitting terminals to the common mode voltage before the serial link transmitter transmits data to the serial link receiver.

The invention also provides another serial link transmitter. In one embodiment, the serial link transmitter is coupled to a serial link receiver through a pair of transmission lines and has a pair of transmitting terminals respectively coupled to one of the transmission lines. The serial link transmitter comprises a differential amplifier and a voltage clamping circuit. The differential amplifier is arranged to generate a pair of differential output voltages on the transmitting terminals according to a pair of differential input voltages to transmit data to the serial link receiver, wherein the differential output voltages are transmitted with a common mode voltage to the serial link transmitter during data transmission. The voltage clamping circuit is arranged to clamp the pair of differential output voltages of the transmitting terminals to the common mode voltage before the serial link transmitter transmits data to the serial link receiver.

The invention provides a method for controlling a serial link transmitter. In one embodiment, the serial link transmitter is coupled to a serial link receiver through a pair of transmission lines and has a pair of transmitting terminals respectively coupled to one of the transmission lines for transmitting data to the serial link receiver. When the serial link transmitter transmits data to the serial link receiver, a pair of differential output voltages are generated on the transmitting terminals for transmitting data to the serial link receiver, wherein the pair of differential output voltages are transmitted with a common mode voltage to the serial link receiver during data transmission. Before the serial link transmitter transmits data to the serial link receiver, the pair of differential output voltages of the transmitting terminals are clamped to the common mode voltage.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
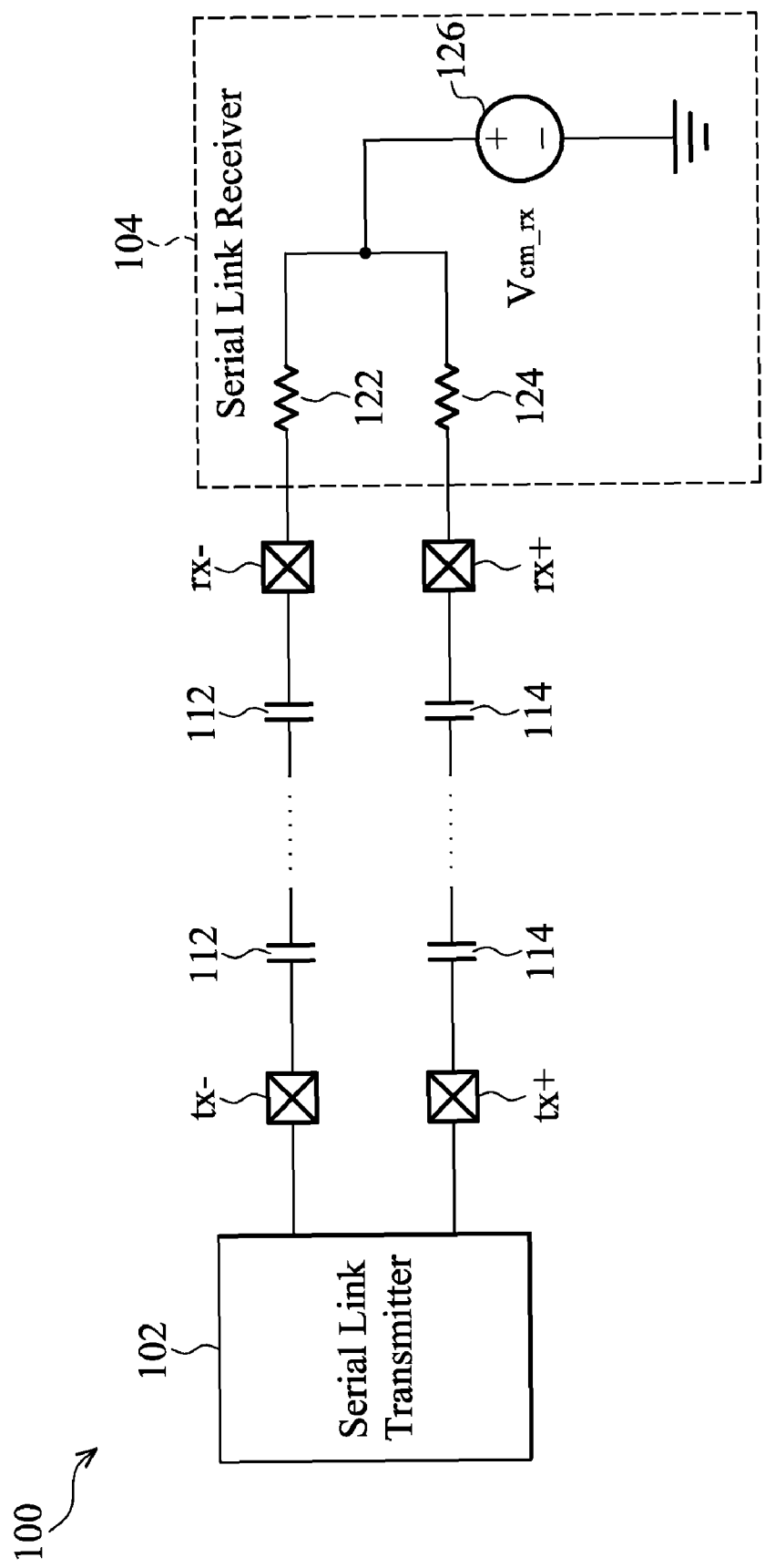
FIG. 1A is a block diagram of a conventional serial link transmission system.
Figure 1B:
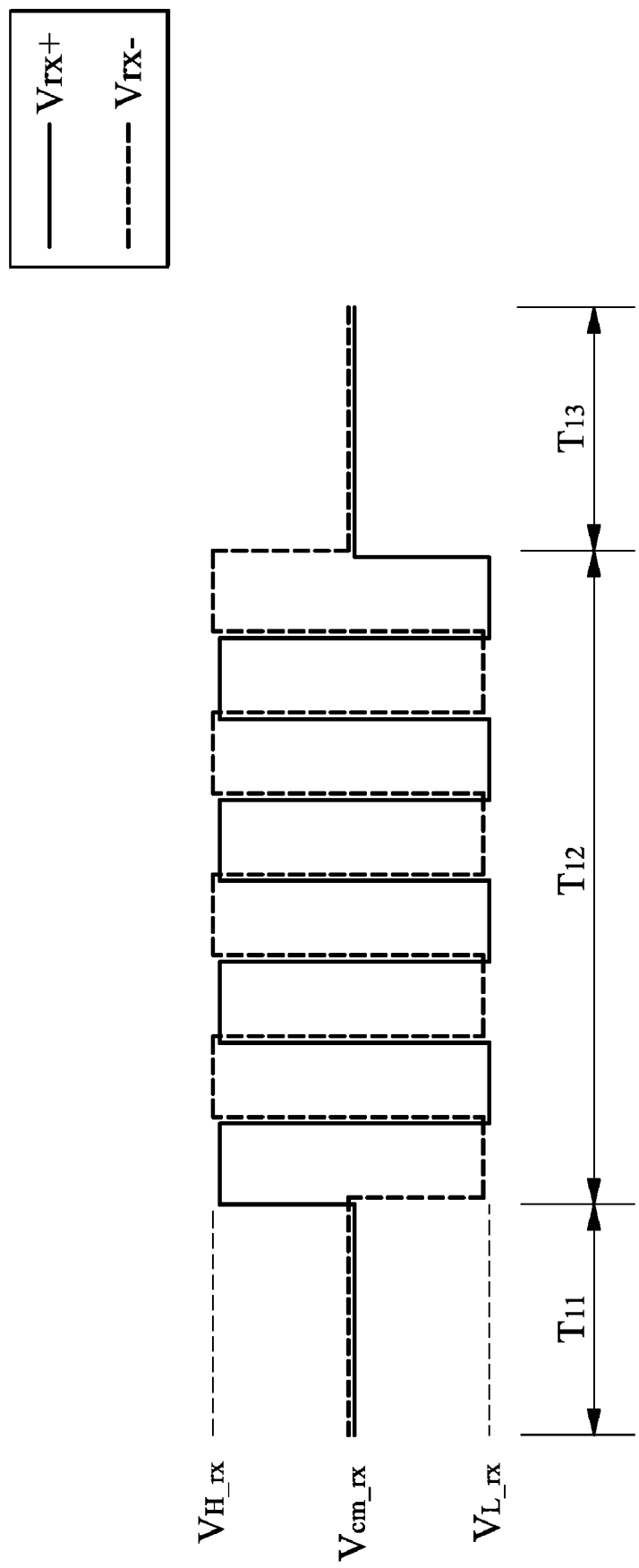
FIG. 1B is a schematic diagram of signals received by a serial link receiver of FIG. 1A.
Figure 2:
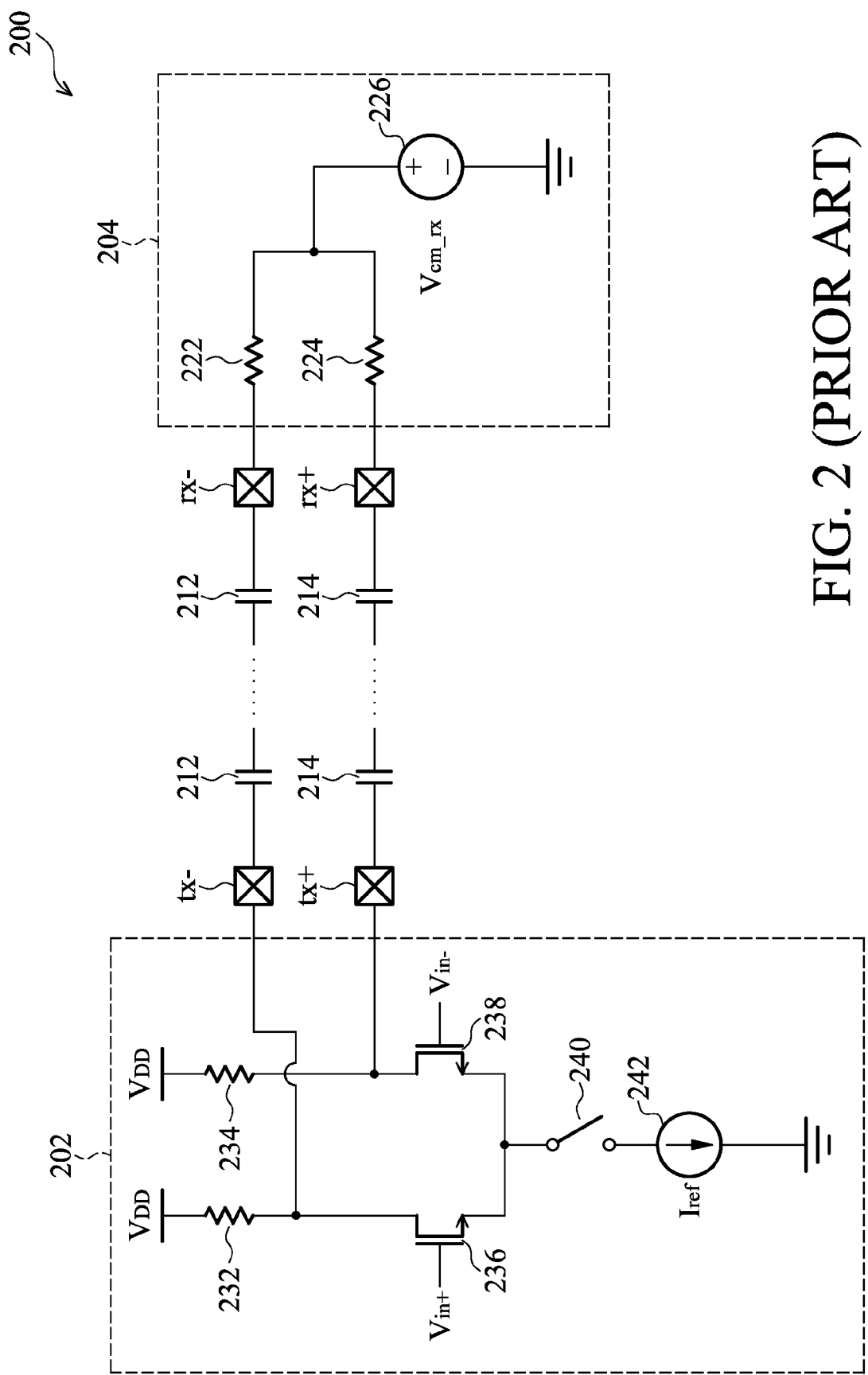
FIG. 2 is a block diagram of a serial link transmission system with a conventional serial link transmitter.
Figure 3:
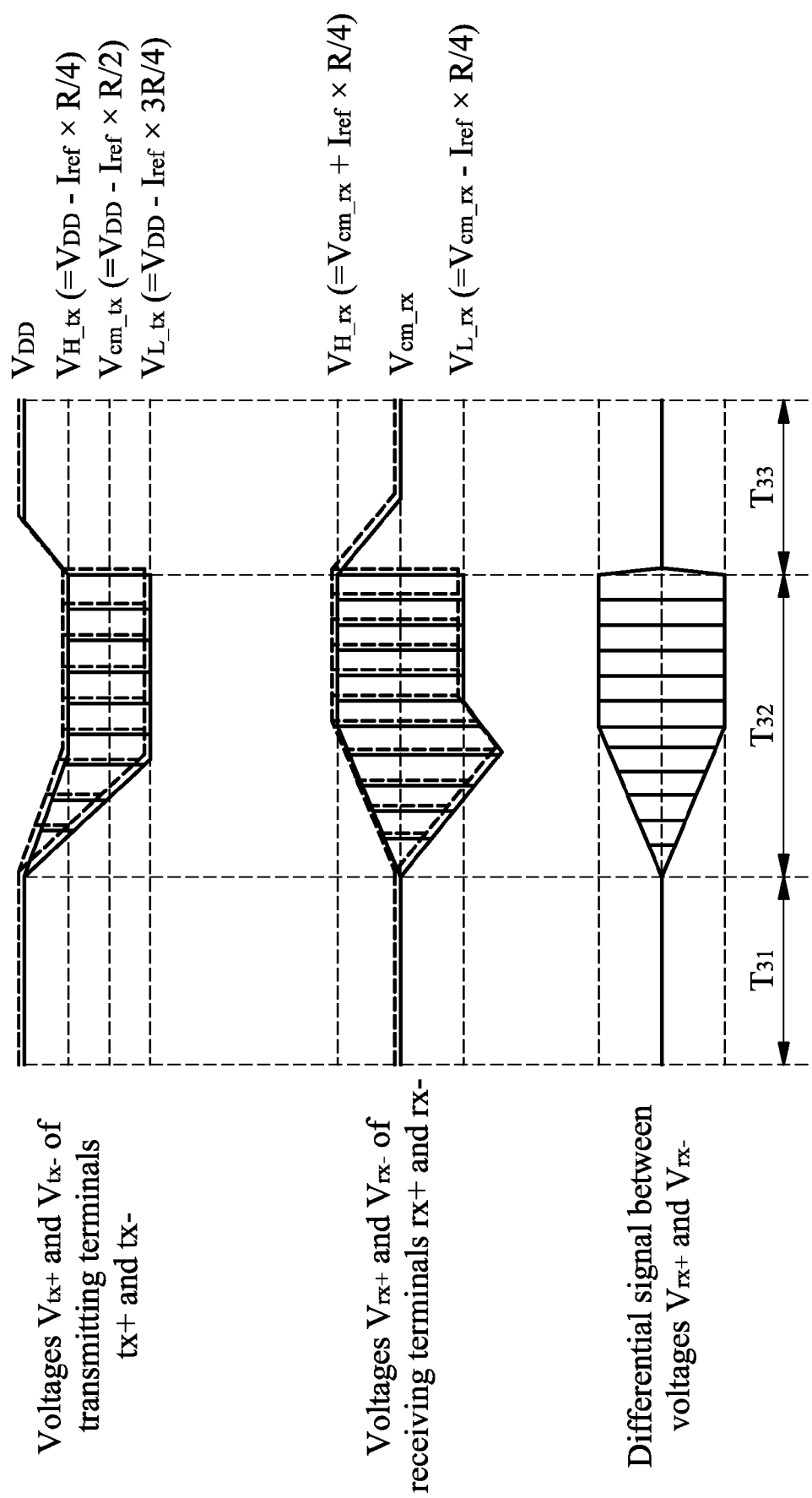
FIG. 3 is a schematic diagram of an embodiment of voltages of transmitting terminals and receiving terminals of FIG. 2.
Figure 4:
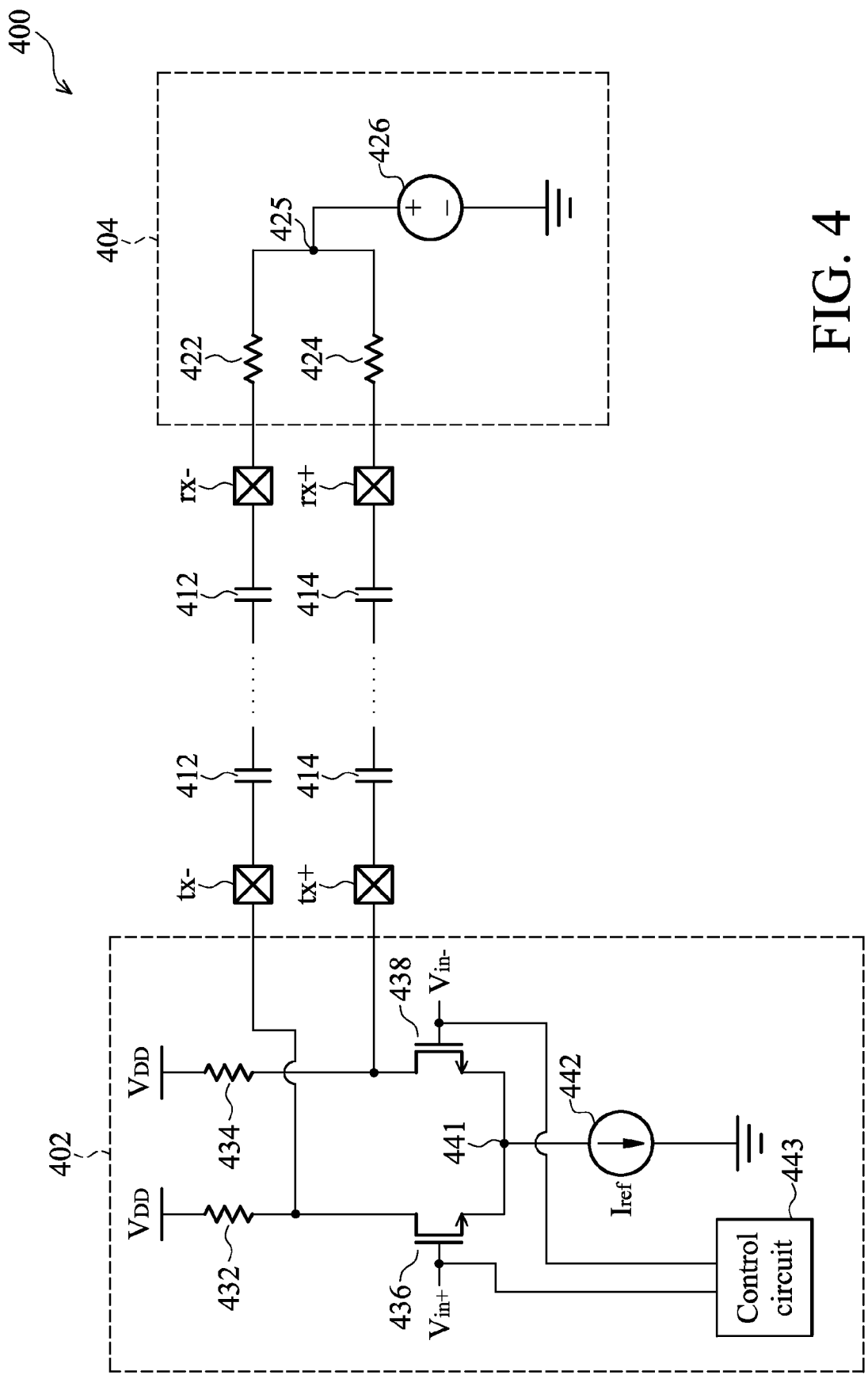
FIG. 4 is a block diagram of a serial link transmission system with a serial link transmitter according to the invention.

Referring to FIG. 4, a block diagram of a serial link transmission system 400 with a serial link transmitter 402 according to the invention is shown. The serial link transmitter 402 is for data transmission to a serial link receiver 404. A pair of differential transmitting terminals tx+ and tx− of the serial link transmitter 402 are coupled to a pair of differential receiving terminals rx+ and rx− of the serial link receiver 404 via a pair of transmission lines with alternate current (AC) capacitances 412 and 414. When the serial link transmitter 402 transmits data, the serial link transmitter 402 generates a pair of differential output voltages $V_{tx+}$ and $V_{tx-}$ on the transmitting terminals tx+ and tx− according to a pair of differential input voltages $V_{in+}$ and $V_{in-}$. Because the AC capacitances 412 and 414 of the transmission lines is greater than 1 nF, only an alternate current portion of the differential output voltages $V_{tx+}$ and $V_{tx-}$ is passed to the receiving terminals rx+ and rx−. The serial link receiver 404 thus receives the transmitted data via the receiving terminals rx+ and rx−. In one embodiment, the serial link receiver 404 comprises two resistors 422 and 424 coupled between the receiving terminals rx+ and rx− and a voltage source 426.

The serial link transmitter 402 comprises a differential amplifier and a control circuit 443. The differential amplifier generates output voltages $V_{tx+}$ and $V_{tx-}$ on the transmitting terminals tx+ and tx− according to differential input voltages $V_{in+}$ and $V_{in-}$. In one embodiment, the differential amplifier comprises resistors 432 and 434, input transistors 436 and 438, and a current source 442. The resistor 432 is coupled between a high voltage source $V_{DD}$ and a negative transmitting terminal tx−, and the resistor 434 is coupled between the high voltage source $V_{DD}$ and a positive transmitting terminal tx+. The input transistor 436 is coupled between the negative transmitting terminal tx− and a node 441, and the input transistor 438 is coupled between the positive transmitting terminal tx+ and the node 441. The current source 442 draws a current $I_{ref}$ from the node 441.

The control circuit 443 is coupled to the gates of both the transistors 436 and 438. When the serial link transmitter 402 transmits data, although the voltages $V_{tx+}$ and $V_{tx-}$ generated by the serial link transmitter 402 changes with time, both of the voltages $V_{tx+}$ and $V_{tx-}$ alter from a common mode voltage $V_{cm\_tx}$. In other words, the differential output voltages $V_{tx+}$ and $V_{tx-}$ are transmitted to the serial link receiver 404 with the common mode voltage $V_{cm\_tx}$. In one embodiment, resistance of the resistors 432, 434, 422, and 424 is R, and the common mode voltage $V_{cm\_tx}$ is therefore equal to $(V_{DD} - I_{ref} \times R/2)$. When the serial link transmitter 402 does not transmit data, unlike the conventional serial link transmitter 202, the current source 442 of the serial link transmitter 402 is not turned off and still provides the differential amplifier with the current $I_{ref}$. In addition, the control circuit 443 applies a voltage to the gates of the input transistors 436 and 438 to turn on the input transistors 436 and 438, for example, approximately in the same time. Two currents of ($I_{ref}/2$) therefore respectively pass through the resistors 432 and 434, and voltage drops of ($R \times I_{ref}/2$) are respectively induced between the high voltage source $V_{DD}$ and the transmitting terminals tx+ and tx−, resulting in voltages ($V_{DD}$−Iref×R/2) on the transmitting terminals tx+ and tx−. Thus, both voltages of the transmitting terminals tx+ and tx− are equal to the common source voltage $V_{cm\_tx}$ when the serial link transmitter 402 is not transmitting data to the serial link receiver 404.

In the previous embodiment, the serial link transmitter 402 clamps a pair of differential voltages of the transmitting terminals tx+ an tx− to a common mode voltage $V_{cm\_tx}$ before the serial link transmitter 402 transmits data to the serial link receiver 404. In one embodiment, when the serial link transmitter 402 is not transmitting data to the serial link receiver 404, the serial link transmitter 402 clamps the pair of differential output voltages $V_{tx+}$ and $V_{tx-}$ of the transmitting terminals tx+ an tx− to the common mode voltage $V_{cm\_tx}$ according to a signal indicative of initiating the data transmission, wherein the signal indicative of initiating the data transmission corresponds to out-of-band signaling. An out-of-band signal, for example, is a low speed signal pattern detected by physical layer circuits for physical layer control and do not appear in normal data streams, such as COMNIT, COMRESET, and COMWAKE signals in SATA standard and a COMSAS signal in SAS standard.

In the previous embodiment, the current source 442 draws a current Iref from the node 441 regardless of whether the serial link transmitter 402 is transmitting data. The current source 442, however, may draw the current with different amounts in different situations. In one embodiment, when the serial link transmitter 402 does not transmit data, the current source 442 draws a current with an amount lower than that for data transmission from the node 441 to reduce power consumption. Before the serial link transmitter 402 starts to transmit data, the current source 442 draws a current Iref from the node 441 to return the voltages of the transmitting terminals tx+ and tx− to the common mode voltage $V_{cm\_tx}$.

Figure 5:
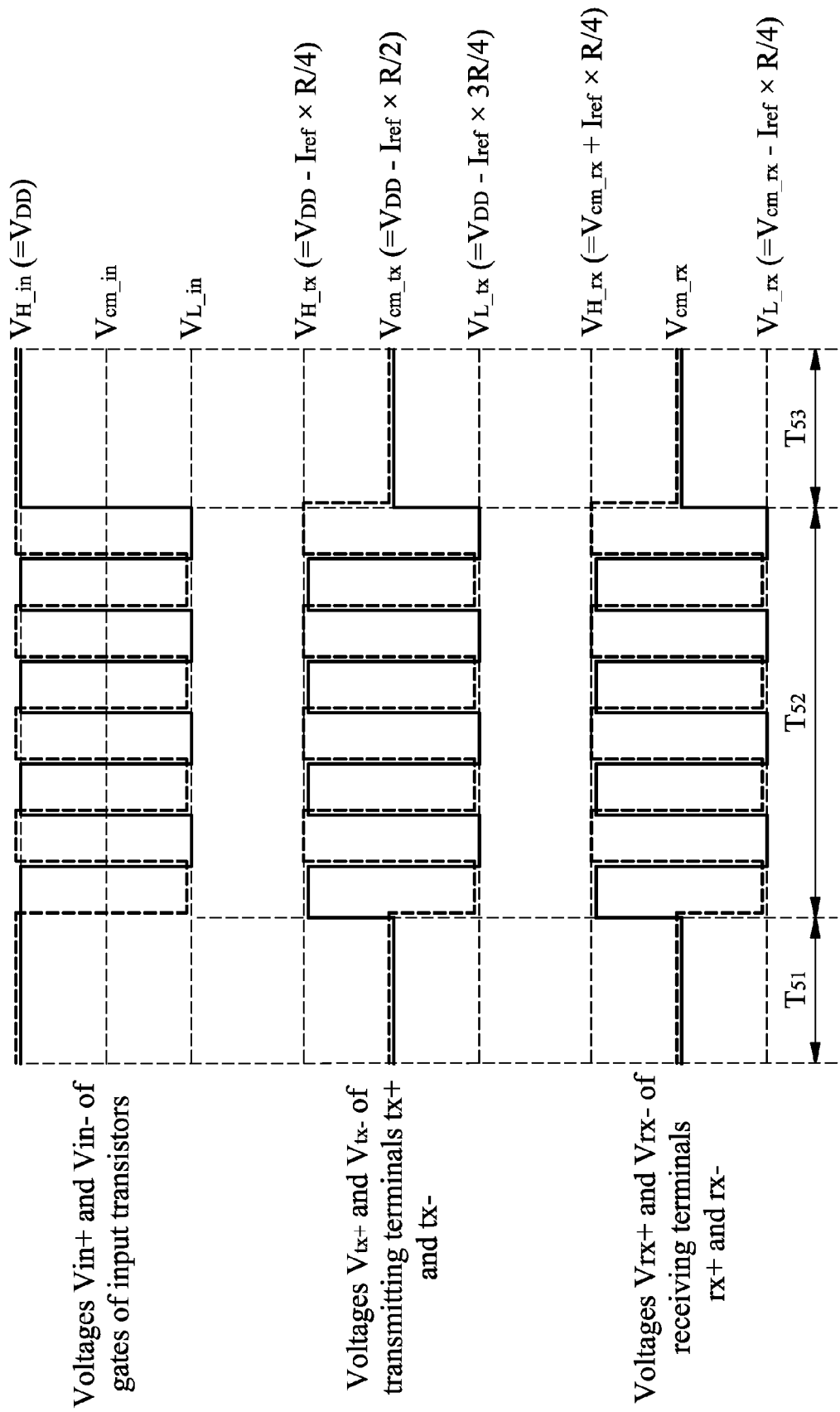
FIG. 5 is a schematic diagram of an embodiment of voltages of transmitting terminals and receiving terminals of FIG. 4.

Referring to FIG. 5, a schematic diagram of an embodiment of voltages of transmitting terminals tx+ and tx− and receiving terminals rx+ and rx− of FIG. 4 is shown. The serial link transmitter 402 transmits data to the serial link receiver 404 during a period $T_{52}$ and is not transmitting data during periods $T_{51}$ and $T_{53}$. During the signaling period $T_{52}$, the transmitting terminals tx+ and tx− are transmitted with a common mode voltage $V_{cm\_tx}$. During the no-signaling period $T_{51}$ and $T_{53}$, the control circuit 443 raises the voltages of the gates of the input transistors to a level for turning on the input transistors 436 and 438, for example, a voltage supplied by the high voltage source $V_{DD}$, and thus the current source 442 still supplies the current $I_{ref}$. The voltages of the transmitting terminals tx+ and tx− therefore are kept at the level of the common mode voltage $V_{cm\_rx}$ during the non-signaling periods $T_{51}$ and $T_{53}$. In other words, when the serial link transmitter 402 starts to transmit data during the period T52, because the initial voltages of the transmitting terminals tx+ and tx− are equal to the common mode voltage $V_{cm\_rx}$, the serial link transmitter 402 does not need to charge the capacitances 412 and 414 of the transmission lines, and initial amplitude reduction of the differential output voltages $V_{tx+}$ and $V_{tx-}$ on the transmitting terminals tx+ and tx− can be mitigated. Consequently, the receiving terminals rx+ and rx− of the serial link receiver 404 receive voltages $V_{rx+}$ and $V_{rx-}$ with normal initial oscillating amplitudes during the signaling period $T_{52}$. Accordingly, in this embodiment, when the serial link receiver 404 measures an initial amplitude of the received signals $V_{rx+}$ and $V_{rx-}$ to obtain a reference for out-of-band determination, the measured initial amplitudes of the received signals $V_{rx+}$ and $V_{rx-}$ do not cause errors typically caused by the conventional serial link transmission system 200.

Figure 6:
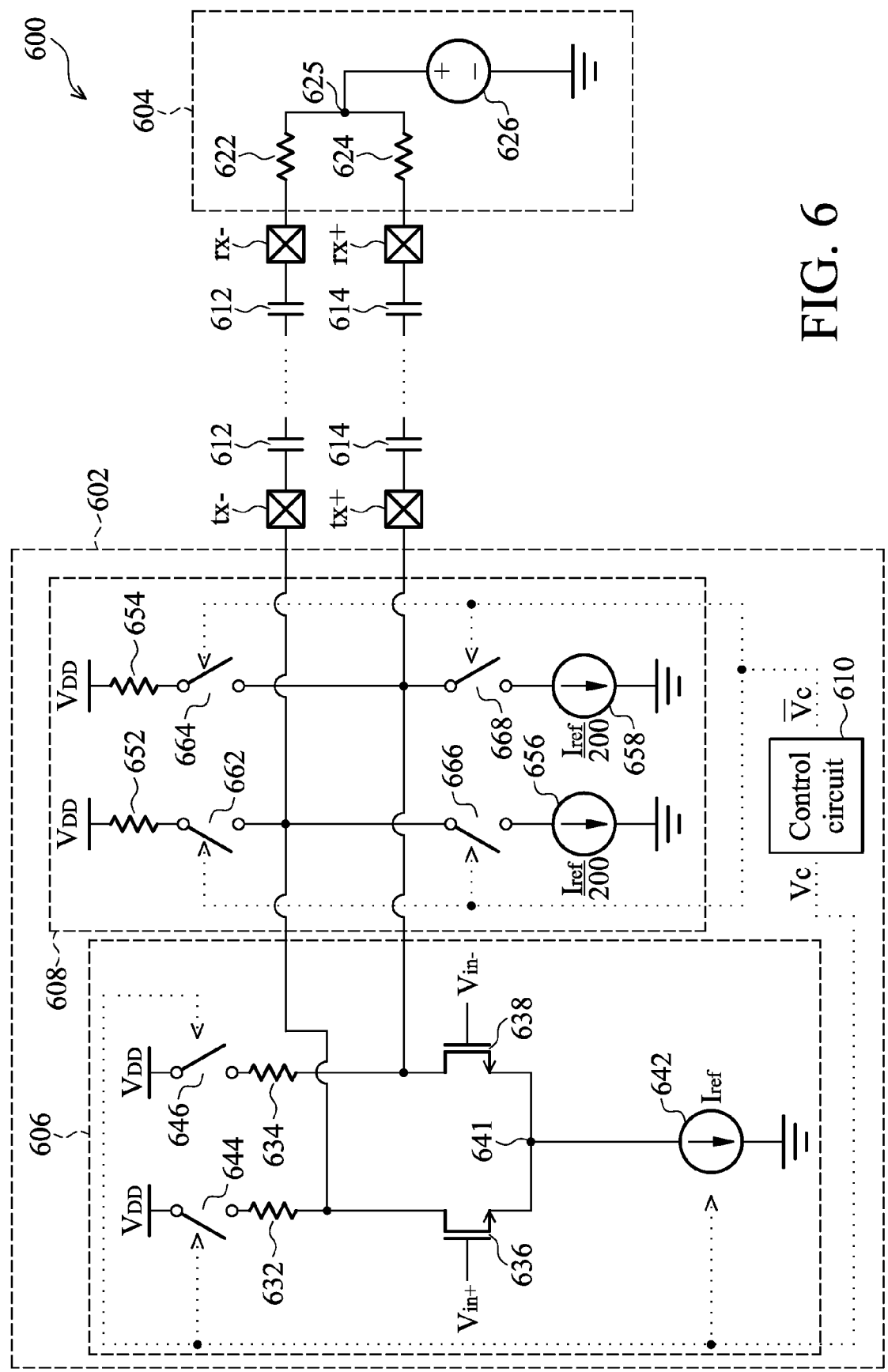
FIG. 6 is a block diagram of a serial link transmission system according to another embodiment of the invention.

Because the current source 442 supplies a current $I_{ref}$ to the serial link transmitter 402 when the serial link transmitter 402 is not transmitting data, during the no-signaling period, an energy of ($I_{ref}^2 \times R/2$) is consumed by the serial link transmitter 402. To reduce energy consumption when the serial link transmitter does not transmit data, other embodiments of the serial link transmitter are provided. Referring to FIG. 6, a block diagram of a serial link transmission system 600 according to an embodiment of the invention is shown. The serial link transmission system 600 comprises a serial link transmitter 602 and a serial link receiver 604. The serial link transmitter 602 comprises a differential amplifier 606, a voltage clamping circuit 608, and a control circuit 610. When the serial link transmitter 602 transmits data, the control circuit 610 generates a control signal $V_c$ to enable the differential amplifier 606, and the differential amplifier 606 generates differential output signals $V_{tx+}$ and $V_{tx-}$ on the transmitting terminals tx+ and tx− according to the differential input signals $V_{in+}$ and $V_{in-}$. Before the serial link transmitter 602 transmit data, the control circuit 610 disables the differential amplifier 606 by the control signal $V_c$, and generates an inverse control signal $\overline{V_c}$ having a voltage inverse to that of the control signal Vc to enable the voltage clamping circuit 608. The voltage clamping circuit 608 then to clamps the voltages $V_{tx+}$ and $V_{tx-}$ of the transmitting terminals tx+ and tx− to a common mode voltage $V_{cm\_tx}$ before the serial link transmitter 602 transmit data.

The differential amplifier 606 is similar to the differential amplifier of the serial link transmitter 402 except that switches 644 and 646 controlled by a control signal Vc are added to the differential amplifier 606. In addition, the control signal Vc also controls whether the current source 642, an NMOS transistor for example, is turned on or off. When the serial link transmitter 602 transmits data, the control circuit 610 turns on the switches 644 and 646 to connect the high voltage source $V_{DD}$ to the resistors 632 and 634. In addition, the control circuit 610 also turns on the current source 642. Thus, the control signal Vc enables the differential amplifier 606 to transmit signals. In addition, the control circuit 610 decouples the voltage clamping circuit 608 from the transmitting terminals tx+ and tx− by the inverse control signal $\overline{V_c}$. The differential output voltages $V_{tx+}$ and $V_{tx-}$ therefore are not affected by the voltage clamp circuit 608 during data transmission in this embodiment.

When the serial link transmitter 602 does not transmit data, the control circuit 610 turns off the switches 644 and 646, by the control signal Vc, to decouple the high voltage source $V_{DD}$ from the resistors 632 and 634. In addition, the control circuit 610 turns off the current source 642, thus disabling the differential amplifier 606. Moreover, the control circuit 610 enables the voltage clamp circuit 608 by the inverse control signal $\overline{V_c}$. The voltage clamp circuit 608 comprises resistors 652 and 654, current sources 656 and 658, and switches 662, 664, 666, and 668 controlled by the inverse control signal $\overline{V_c}$. In one embodiment, the resistors 652 and 654 have resistance 100×R equal to 100 times that of the resistance R of the resistors 632 and 634, and the current sources 656 and 658 supply a current $I_{ref}/200$ equal to 1/200 of the current $I_{ref}$ supplied by the current source 642. When the voltage clamp circuit 608 is enabled, the switches 662 and 664 respectively couple the resistors 652 and 654 to the transmitting terminals tx− and tx+, and the switches 666 and 668 respectively couple the current sources 656 and 658 to the transmitting terminals tx− and tx+. The transmitting terminals tx+ and tx− therefore have a voltage ($V_{DD}-R \times I_{ref}/2$) equal to the common mode voltage $V_{cm\_tx}$ when the serial link transmitter 602 is not transmitting data, thus avoiding charging of the AC capacitances 612 and 614 during data transmission. In this embodiment, the power consumption of the voltage clamping circuit 608 is ($I_{ref}^2 \times R/200$), which is only 1/100 of that of the serial link transmitter 402.

According to another embodiment, the switching of the current source 642 can be implemented by a combination of the current source 642 and an additional switch (not illustrated) which connected between the current source and the node 641 of the differential amplifier 606. The additional switch is controlled by the control signal Vc to couple the current source 642 to or decouple to current source 642 from the node 641, and the current source 642 in this embodiment is typically turned on or switched on or off together with the additional switch.

Figure 7:
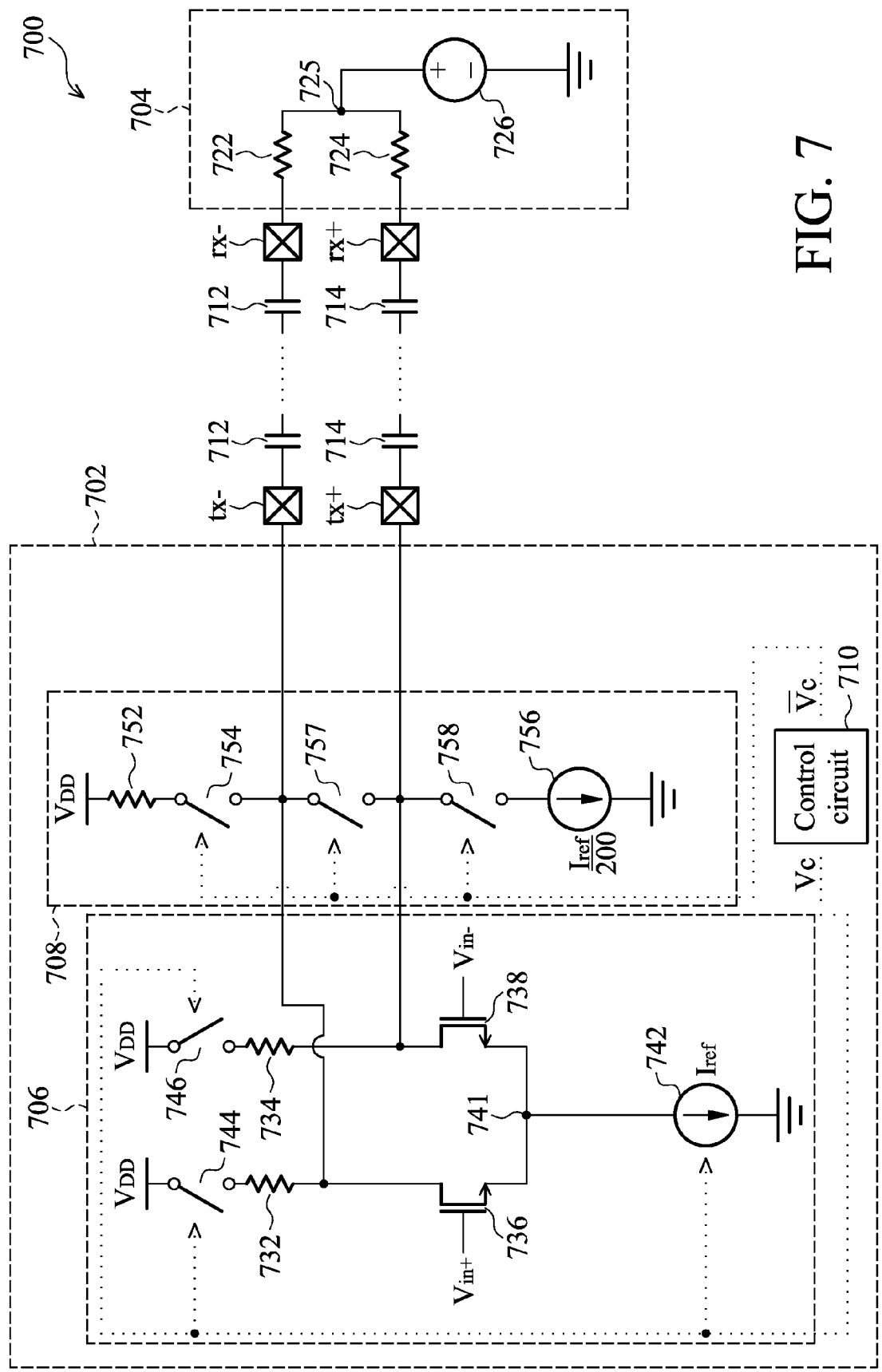
FIG. 7 shows a serial link transmission system comprising a serial link transmitter with another embodiment of a voltage clamp circuit.

FIG. 7 shows a serial link transmitter 702 with another embodiment of a voltage clamp circuit 708. The voltage clamp circuit 708 clamps the voltages of both the transmitting terminals tx+ and tx− with a circuit set comprising a resistor 752 and a current source 756. Three switches 754, 757, and 758 are respectively coupled between the resistor 752 and the transmitting terminal tx−, the transmitting terminals tx− and tx+, and the transmitting terminal tx+ and the current source 756. The switch 757 is controlled by the inverse control signal $\overline{V_c}$. The control circuit 710 operates similarly as the control circuit 610 in FIG. 6, and the detailed description is omitted for clarity.

Figure 8:
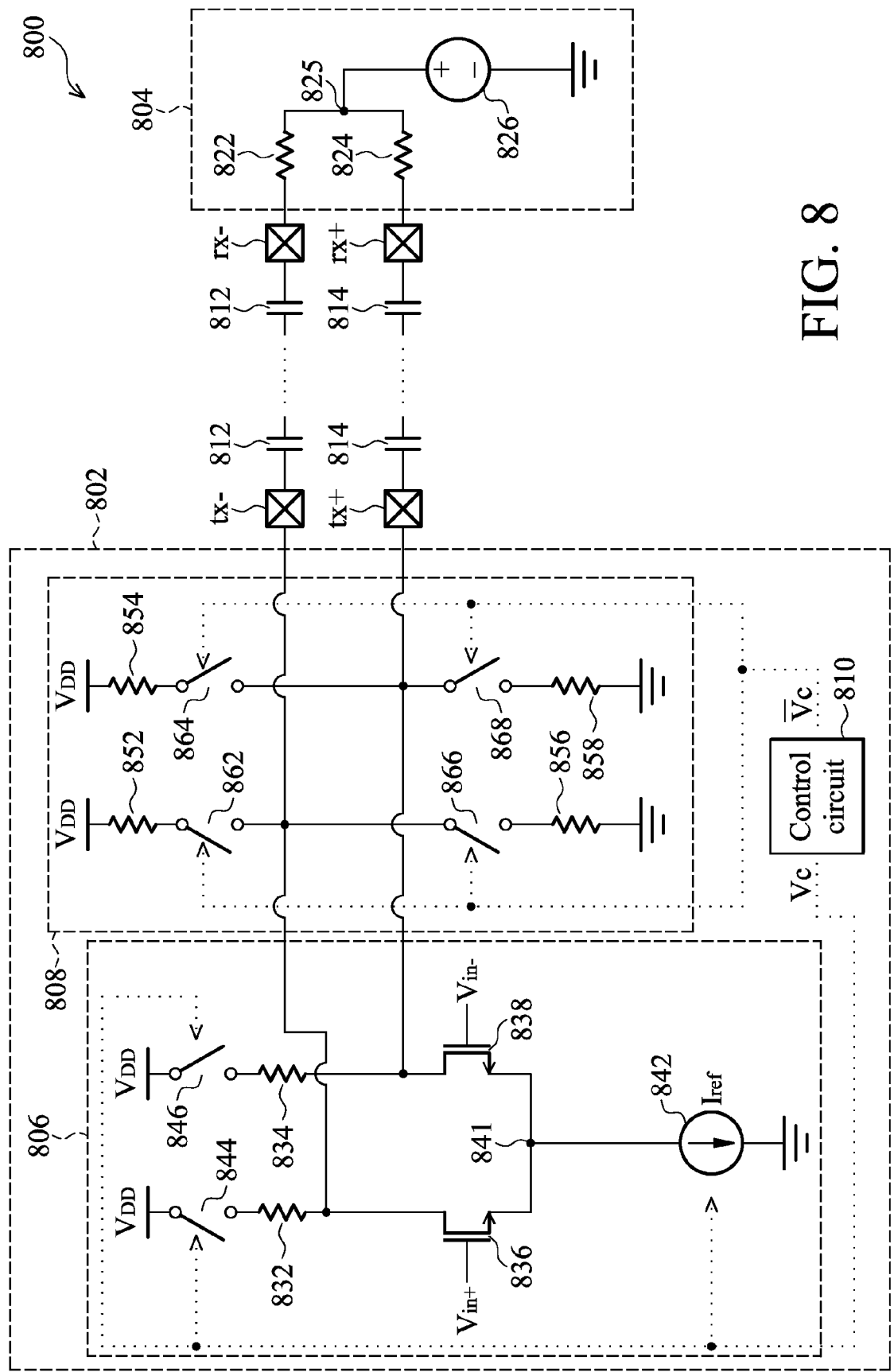
FIG. 8 is a block diagram of a serial link transmission system according to another embodiment of the invention.

Referring to FIG. 8, a block diagram of a serial link transmission system 800 according to another embodiment of the invention is shown. The serial link transmission system 800 comprises a serial link transmitter 802 comprising a differential amplifier 806, a voltage clamp circuit 808, and a control circuit 810. The voltage clamp circuit 808 comprises two sets of voltage dividers. A first voltage divider comprises resistors 852 and 856 and switches 862 and 866. A second voltage divider comprises resistors 854 and 858 and switches 864 and 868. When the serial link transmitter 802 transmits data, the control circuit 810 generates a control signal Vc to turn on the switches 844 and 846 and the current source 842, thus enabling the differential amplifier 806. In addition, the control circuit 810 transmits an inverse control signal $\overline{V_c}$ to turn off the switches 862, 864, 866, and 868, thus disabling the voltage clamp circuit 808. The differential amplifier 806 then generates a pair of differential output voltages on the output terminals tx+ and tx− to transmit data to the serial link receiver 804. When the serial link transmitter 802 is not transmitting data, the control circuit 810 turns off the switches 844 and 846 and the current source 842 by the control signal Vc, and turns on the switches 862, 864, 866, and 868 to enable the voltages dividers of the voltage clamp circuit 808 by the inverse control signal $\overline{V_c}$. The first voltage divider then clamps the voltage of the negative transmitting terminal tx− to a common mode voltage $V_{cm\_tx}$, and the second voltage divider clamps the voltage of the positive transmitting terminal tx+ to the common mode voltage $V_{cm\_tx}$, thus avoiding charging of the AC capacitances 812 and 814 during initial data transmission.

Figure 9:
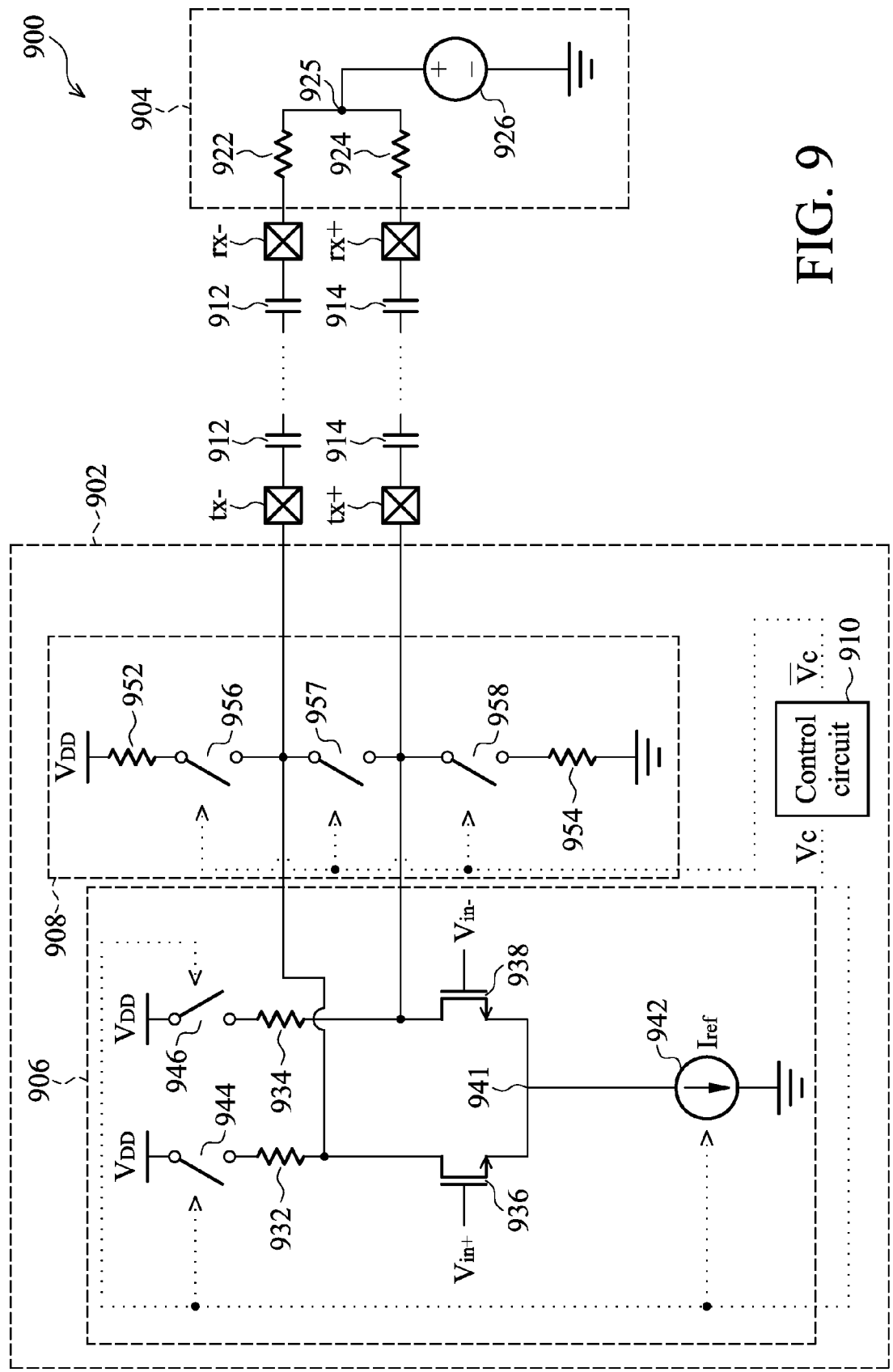
FIG. 9 shows a serial link transmission system comprising a serial link transmitter with another embodiment of a voltage clamp circuit.

FIG. 9 shows a serial link transmitter 902 with another embodiment of a voltage clamp circuit 908. The voltage clamp circuit 908 comprises resistors 952 and 954 and switches 956, 957, and 958. When the serial link transmitter 902 does not transmit data, the control circuit turns on the switches 956, 957, and 958 by the inverse control signal $\overline{V_c}$, thus allowing the resistors 952 and 954 to clamp the voltages of both the transmitting terminals tx+ and tx− to a common mode voltage $V_{cm\_tx}$. The control circuit 910 operates similarly as the control circuit 810 in FIG. 8, and the detailed description is omitted for clarity.

It is noted that the functional blocks illustrated in FIGS. 6-9 are schematic, not for the purpose of limiting how to implement them in physical circuits. For example, the voltage clamping circuit 608 in FIG. 6 can be implemented by the physical resistors 632 and 634 and current source 642. In one example, if the resistors 632 and 634 are controllable or combined by plural segments, e.g. digital controlled resistors, and the current source 642 is adjustable, the resistances of the resistors 632 and 634 and the current amount of the current source 642 can be changed in order to perform the functions of the voltage clamping circuit 608 as described above, thus equivalently achieving the result of disabling differential amplifier 606 and enabling voltage clamping circuit 608. In other words, the functional blocks 608, 708, 808, 908 may physically overlap the functional blocks 606, 706, 806, 906 illustrated in FIG. 6, 7, 8, 9, respectively, while implemented by concrete circuits. The two functional blocks of the serial link transmitter, e.g. the differential amplifier and the voltage clamping circuit, are not limited to be two separate and independent circuits as exemplarily illustrated.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A serial link transmitter, coupled to a serial link receiver through a pair of transmission lines, having a pair of transmitting terminals respectively coupled to one of the transmission lines, generating a pair of differential output voltages on the transmitting terminals for transmitting data to the serial link receiver, wherein the differential output voltages are transmitted with a common mode voltage to the serial link receiver during data transmission, characterized in that during a no-signaling period of signal transmission from the serial link transmitter to the serial link receiver, the serial link transmitter is arranged to clamp the pair of differential output voltages of the transmitting terminals to the common mode voltage before the serial link transmitter transmits data to the serial link receiver.

2. The serial link transmitter as claimed in claim 1, wherein when the serial link transmitter is not transmitting data to the serial link receiver, the serial link transmitter is arranged to clamp the pair of differential output voltages of the transmitting terminals to the common mode voltage according to a signal indicative of initiating the data transmission.

3. The serial link transmitter as claimed in claim 2, wherein the signal indicative of initiating the data transmission corresponds to out-of-band signaling.

4. The serial link transmitter as claimed in claim 1, wherein the serial link transmitter comprises:
- a differential amplifier for generating the pair of differential output voltages on the transmitting terminals according to a pair of differential input voltages, wherein the differential amplifier comprises a current source for providing the differential amplifier with a current regardless of whether the serial link transmitter is transmitting data.

5. The serial link transmitter as claimed in claim 1, wherein the transmitting terminals comprise a positive transmitting terminal and a negative transmitting terminal, and the serial link transmitter comprises:
- a first transistor, coupled between the negative transmitting terminal and a node, having a gate coupled to a positive input voltage;
- a second transistor, coupled between the positive transmitting terminal and the node, having a gate coupled to a negative input voltage,
- a control circuit, arranged to turn on the first transistor and the second transistor by the positive input voltage and the negative input voltage, respectively, before the serial link transmitter transmits data to the serial link receiver; and
- the current source, coupled between the node and a ground voltage, for drawing a current from the node.

6. The serial link transmitter as claimed in claim 1, wherein the serial link transmitter comprises:
- a differential amplifier, for generating the pair of differential output voltages on the transmitting terminals according to a pair of differential input voltages;
- a voltage clamping circuit, for clamping the pair of differential output voltages of the transmitting terminals to the common mode voltage; and
- a control circuit, arranged to enable the differential amplifier and disable the voltage clamping circuit when the serial link transmitter transmits data to the serial link receiver, and disable the differential amplifier and enable the voltage clamping circuit before the serial link transmitter transmits data to the serial link receiver.

7. A serial link transmitter, coupled to a serial link receiver through a pair of transmission lines, having a pair of transmitting terminals respectively coupled to one of the transmission lines, wherein the serial link transmitter comprises:
- a differential amplifier, for generating a pair of differential output voltages on the transmitting terminals according to a pair of differential input voltages to transmit data to the serial link receiver, wherein the differential output voltages are transmitted with a common mode voltage to the serial link receiver during data transmission; and
- a voltage clamping circuit, for during a no-signaling period of signal transmission from the serial link transmitter to the serial link receiver, clamping the pair of differential output voltages of the transmitting terminals to the common mode voltage before the serial link transmitter transmits data to the serial link receiver.

8. The serial link transmitter as claimed in claim 7, wherein when the serial link transmitter is not transmitting data to the serial link receiver, the voltage clamping circuit is arranged to clamp the pair of differential output voltages of the transmitting terminals to the common mode voltage according to a signal indicative of initiating the data transmission.

9. The serial link transmitter as claimed in claim 8, wherein the signal indicative of initiating the data transmission corresponds to out-of-band signaling.

10. The serial link transmitter as claimed in claim 7, further comprising:
- a control circuit, arranged to enable the differential amplifier and disable the voltage clamping circuit when the serial link transmitter transmits data to the serial link receiver, and disable the differential amplifier and enable the voltage clamping circuit before the serial link transmitter transmits data to the serial link receiver, wherein the transmitting terminals comprise a positive transmitting terminal and a negative transmitting terminal, and the differential input voltages comprise a positive input voltage and a negative input voltage.

11. The serial link transmitter as claimed in claim 10, wherein the differential amplifier comprises:
- a first resistor, coupled between a first switch and the negative transmitting terminal;
- the first switch, for connecting the first resistor to a high voltage source according to a control signal;
- a second resistor, coupled between a second switch and the positive transmitting terminal;
- the second switch, for connecting the second resistor to the high voltage source according to the control signal;
- a first transistor, coupled between the negative transmitting terminal and a node, having a gate coupled to the positive input voltage;
- a second transistor, coupled between the positive transmitting terminal and the node, having a gate coupled to the negative input voltage; and
- the current source, coupled between the node and a ground voltage, for drawing a current from the node when tuned on by the control signal.

12. The serial link transmitter as claimed in claim 10, wherein the voltage clamping circuit comprises:
- a first resistor, coupled between a high voltage source and a first switch;
- the first switch, for connecting the first resistor to the negative transmitting node when turned on by an inverse control signal inverse to the control signal;
- a second resistor, coupled between the high voltage source and a second switch;
- the second switch, for connecting the second resistor to the positive transmitting node when turned on by the inverse control signal;
- a third switch, for connecting a first current source to the negative transmitting terminal when turned on by the inverse control signal;
- the first current source, coupled between the third switch and a ground voltage, for drawing a first current from the negative transmitting terminal when connected to the negative transmitting terminal;
- a fourth switch, for connecting a second current source to the positive transmitting terminal when turned on by the inverse control signal; and
- the second current source, coupled between the fourth switch and the ground voltage, for drawing a second current from the positive transmitting terminal when connected to the positive transmitting terminal.

13. The serial link transmitter as claimed in claim 10, wherein the voltage clamping circuit comprises:
- a first resistor, coupled between a high voltage source and a first switch;
- the first switch, for connecting the first resistor to the negative transmitting node when turned on by an inverse control signal inverse to the control signal;
- a second switch, for connecting a current source to the positive transmitting terminal when turned on by the inverse control signal;

a third switch, for connecting the positive transmitting node and the negative transmitting node when turned on by the inverse control signal; and the current source, coupled between the second switch and a ground voltage, for drawing a current from the positive transmitting terminal and the negative transmitting terminal when connected to the positive transmitting terminal and the negative transmitting terminal.

14. The serial link transmitter as claimed in claim 10, wherein the voltage clamping circuit comprises:
a first resistor, coupled between a high voltage source and a first switch;
the first switch, for connecting the first resistor to the negative transmitting node when turned on by an inverse control signal inverse to the control signal;
a second resistor, coupled between the high voltage source and a second switch;
the second switch, for connecting the second resistor to the positive transmitting node when turned on by the inverse control signal;
a third switch, for connecting a third resistor to the negative transmitting terminal when turned on by the inverse control signal;
the third resistor, coupled between the third switch and a ground voltage;
a fourth switch, for connecting a fourth resistor to the positive transmitting terminal when turned on by the inverse control signal; and
the fourth resistor, coupled between the fourth switch and the ground voltage.

15. The serial link transmitter as claimed in claim 10, wherein the voltage clamping circuit comprises:
a first resistor, coupled between a high voltage source and a first switch;
the first switch, for connecting the first resistor to the negative transmitting node when turned on by an inverse control signal inverse to the control signal;
a second switch, for connecting the positive transmitting node and the negative transmitting node when turned on by the inverse control signal;
a third switch, for connecting a second resistor to the positive transmitting terminal when turned on by the inverse control signal; and
the second resistor, coupled between the second switch and a ground voltage.

16. A method for controlling a serial link transmitter, wherein the serial link transmitter is coupled to a serial link receiver through a pair of transmission lines and has a pair of transmitting terminals respectively coupled to one of the transmission lines, the method comprising:
when the serial link transmitter transmits data to the serial link receiver, generating a pair of differential output voltages on the transmitting terminals for transmitting data to the serial link receiver, wherein the pair of differential output voltages are transmitted with a common mode voltage to the serial link receiver during data transmission; and
during a no-signaling period of signal transmission from the serial link transmitter to the serial link receiver, clamping the pair of differential output voltages of the transmitting terminals to the common mode voltage before the serial link transmitter transmits data to the serial link receiver.

17. The method for controlling a serial link transmitter as claimed in claim 16, wherein the step of clamping the pair of differential output voltages of the transmitting terminals comprises:
clamping the pair of differential output voltages of the transmitting terminals to the common mode voltage according to a signal indicative of initiating the data transmission when the serial link transmitter is not transmitting data to the serial link receiver.

18. The method for controlling a serial link transmitter as claimed in claim 17, wherein the signal indicative of initiating the data transmission corresponds to out-of-band signaling.

19. The method for controlling a serial link transmitter as claimed in claim 16, wherein the serial link transmitter comprises a differential amplifier for generating the pair of differential output voltages on the transmitting terminals according to a pair of differential input voltages.

20. The method for controlling a serial link transmitter as claimed in claim 19, wherein the step of clamping the pair of differential output voltages of the transmitting terminals comprises:
providing the differential amplifier with a current regardless of whether the serial link transmitter is transmitting data.

21. The method for controlling a serial link transmitter as claimed in claim 16, wherein the transmitting terminals comprise a positive transmitting terminal and a negative transmitting terminal, and the step of clamping the pair of differential output voltages of the transmitting terminals comprises:
coupling a first output terminal of a first voltage divider circuit to the positive transmitting terminal, wherein the first output terminal has a voltage equal to the common mode voltage; and
coupling a second output terminal of a second voltage divider circuit to the negative transmitting terminal, wherein the second output terminal has a voltage equal to the common mode voltage.

22. The method for controlling a serial link transmitter as claimed in claim 16, wherein the step of clamping the pair of differential output voltages of the transmitting terminals comprises:
coupling an output terminal of a voltage divider circuit to the transmitting terminals, wherein the output terminal has a voltage equal to the common mode voltage.

23. The method for controlling a serial link transmitter as claimed in claim 16, further comprising:
providing the transmitting terminals with the common mode voltage by a voltage clamping circuit;
enabling the serial link transmitter and disabling the voltage clamping circuit when the serial link transmitter transmits data to the serial link receiver; and
disabling the serial link transmitter and enabling the voltage clamping circuit before the serial link transmitter transmits data to the serial link receiver.

* * * * *